W. W. SIMMONS.
Making Carriage Axles.
No. 84,845. Patented Dec. 8, 1868.
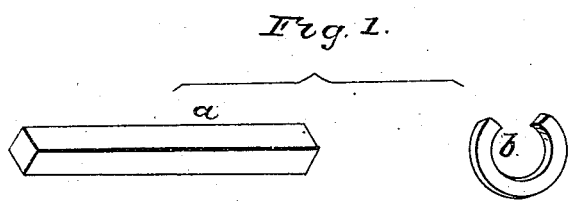
Fig. 1.
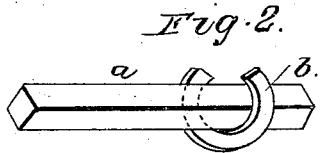
Fig. 2.
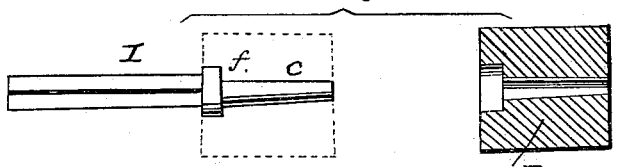
Fig. 3.
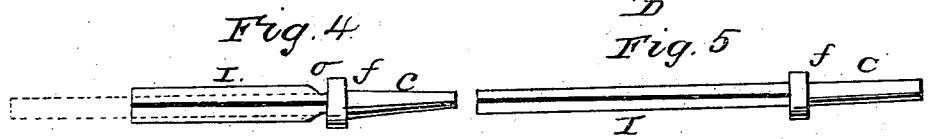
Fig. 4. Fig. 5.
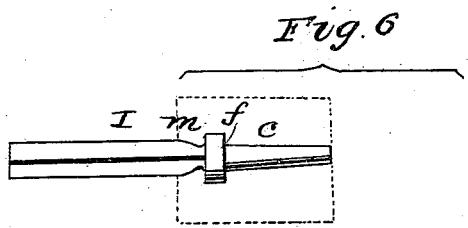
Fig. 6.
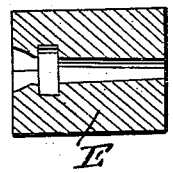
Witnesses
Inventor

United States Patent Office.

W. W. SIMMONS, OF BIRMINGHAM, CONNECTICUT, ASSIGNOR TO HIMSELF, R. M. BASSETT, AND T. S. BASSETT.

Letters Patent No. 84,845, dated December 8, 1868.

IMPROVEMENT IN DIES FOR MAKING CARRIAGE-AXLES.

The Schedule referred to in these Letters Patent and making part of the same.

*To all whom it may concern:*

Be it known that I, W. W. SIMMONS, of Birmingham, of New Haven county, in the State of Connecticut, have invented certain new and useful "Improvements in the Manufacture of Axles;" and I do hereby declare that the following is a full and exact description thereof, reference being had to the accompanying drawings, making part of this application.

My invention relates to a new mode of making axles.

Previous to my invention, carriage-axles have been made by taking a short bar of square iron, and welding on a collar between dies, which, at the same time, gave shape to the collar and to the bearing or journal of the axle, leaving the rest of the bar, back of the collar, (the body of the axle,) unchanged in shape. This last-mentioned portion of the bar or blank had afterwards to be drawn out to the requisite size under a trip-hammer; but, inasmuch as the hammer could not approach the collar near enough to produce a properly-shaped shoulder in rear of the latter, it was necessary, before going to the trip-hammer, that each axle or blank be swaged out by a hand-tool and hand-labor to form the shoulder in rear of the collar, and upset the stock away from the collar far enough to permit the trip-hammer to draw it out and finish it into shape, after which the journal and collar were turned in a lathe.

This mode or method of making axles, it will be seen, necessitates the expense of considerable hand-labor, and besides, the stock cannot well be swaged up by hand, so as to have all the axles made and finished up alike.

My invention has for its objects to dispense with and save the cost of all the hand-labor heretofore employed, and, at the same time, to produce a better and more uniformly-shaped article of manufacture; and to these ends, My invention consists in dies for welding on the collar, shaping the journal and collar, and swaging or upsetting the stock in rear of the collar, all at one operation, so that the axle has only afterward to have its body drawn out under the trip-hammer, and will, when completed, be better finished than those made as heretofore practised.

To enable those skilled, to fully understand and practise my invention, I will proceed to explain more minutely, (referring by letters to the accompanying drawings,) my said invention, as I have successfully practised it.

In order to render perfectly clear the nature of my improvement, and point out the difference between it and what was done before, I deem it expedient to illustrate and describe first the method of making axles as practised prior to my invention.

In the accompanying drawings—

Figure 1 illustrates a bar of iron, and an open collar, such as are usually combined to form a carriage-axle;

Figure 2 is a perspective view of the collar and bar as arranged together, ready to be welded and shaped between the ordinary dies;

Figure 3 is a longitudinal section of the axle, (after having had its collar welded on, and the latter and the journal shaped between the dies,) and of the ordinary welding and shaping-dies;

Figure 4 is a section of said axle, after having had its stock swaged out, or upset, in rear of the collar, by hand-tools and labor, in the customary manner; and Figure 5 illustrates the axle completed, that is, ready to be turned and "finished."

These figures are all illustrative of the known mode of operation or method of manufacture.

At Figure 6, I have illustrated the blank as having had its collar welded on and shaped, the journal shaped, and the stock swaged up in rear of collar, as per my invention, and the dies by which these effects are, at one operation, performed.

As in the ordinary mode or method of manufacture, I take a square bar of iron, *a*, and prepared collar or fillet *b*, (arranged together, as shown at fig. 2,) and heated to a welding-heat; but in lieu of subjecting them to the action of dies D, such as seen at fig. 3, which only shape the portion C and the front side and periphery of collar *f*, while welding on the latter, I subject them to the action of welding and shaping-dies E, which are so shaped as to wholly embrace between them, when they come together, the entire collar *f*, and to swage out or "upset" the stock (at *m*) in rear of the collar, and form a clean shoulder there, and leave the stock so that it can afterward be drawn out properly under the hammer, to form the body of the axle, thus entirely dispensing with the expensive hand-tool operation heretofore practised to form the shoulder in rear of collar *f*, as at *o*, fig. 4, and producing, by means of the dies E, a better and more uniformly-shaped shoulder and collar than could be by the old practice.

After the operation performed by the dies E, I subject the body I of the blank to the usual trip-hammer operation, to draw it out.

It will be seen that the article, or partially-made axle, after it leaves the dies E, has the portion I (see fig. 6) in about the same condition as after having been subjected to both the die and swaging-operation heretofore practised, while by my method or process the whole operation is performed in the same time and at the same expense heretofore necessary for merely welding the collar and shaping the portion C.

It has generally been supposed that because the portion in rear of collar *f* is square, and because it is customary and necessary to keep turning or revolving the blank while being operated upon by the welding-dies, the said dies could not be made to embrace more than the round portions of the article; but I discovered that dies could be made and successfully used which would embrace a portion of the square part of the blank (sufficient in extent) immediately in rear of the round collar *f*, and which would effectually upset or swage out the stock of such portion, so as to form a clean, square shoulder, and leave the blank in a more desirable condition to go to the trip-hammer than it was usually left by the hand-tool operation, and this, too, without the cost of such last-named operation.

Of course the blank seen at fig. 6, and produced by my improved die, has its body, I, drawn out into the usual shape, as seen at fig. 5.

Those who are skilled in the art will understand that the dies E are to be used in the same manner as the ordinary dies, D, are used, and that in subjecting the stock to their action, the workman has only to pay regard to the necessity of turning the blank around far enough exactly (a quarter turn) each time to have the square portion at *m* fit properly in the lower half of die before the upper portion of die comes down on to the stock.

I need not expatiate further on the advantages of my improvement.

The saving of all the hand-tool labor now performed in making the article, and rendered necessary in the use of the ordinary dies, and the greater perfection of the article when finished, are advantages too great and obvious not to be appreciated by the manufacturer.

Having explained my improvement in the manufacture of axles,

What I claim as new, and desire to secure by Letters Patent, is—

The dies E, constructed as shown and described, for the purpose hereinbefore set forth.

In testimony whereof, I have hereunto set my hand and seal, this 30th day of July, 1868.

W. W. SIMMONS. [L. S.]

Witnesses:
H. F. WARRING,
FREDERIC M. CLEMONS.